United States Patent

Stanlake

[11] Patent Number: 5,163,739
[45] Date of Patent: Nov. 17, 1992

[54] WHEEL COVER RETENTION

[75] Inventor: Roland R. Stanlake, Haslett, Mich.

[73] Assignee: General Motors Corporation, Detroit, Mich.

[21] Appl. No.: 751,820

[22] Filed: Sep. 3, 1991

[51] Int. Cl.⁵ .............................................. B60B 7/14
[52] U.S. Cl. .................... 301/37.37; 301/37.42; 301/108.4
[58] Field of Search ............... 301/37 R, 37 P, 37 S, 301/108 R, 108 A, 108 S

[56] References Cited

U.S. PATENT DOCUMENTS

| | | | |
|---|---|---|---|
| 4,357,053 | 11/1982 | Spisak | 301/37 R |
| 4,382,635 | 5/1983 | Brown et al. | 301/37 TP |
| 4,458,952 | 7/1984 | Foster et al. | 301/37 TP |
| 4,547,021 | 10/1985 | Abbate Daga | 301/108 A X |
| 4,707,035 | 11/1987 | Kondo et al. | 301/37 P |
| 4,998,780 | 3/1991 | Eshler et al. | 301/37 S |

FOREIGN PATENT DOCUMENTS

| | | | |
|---|---|---|---|
| 0102702 | 8/1980 | Japan | 301/37 S |
| 0184901 | 8/1987 | Japan | 301/37 S |

*Primary Examiner*—Russell D. Stormer
*Attorney, Agent, or Firm*—Raymond I. Bruttomesso, Jr.

[57] ABSTRACT

A wheel cover retention system has a wheel cover with a cover face for covering a central portion of a wheel and a plurality of integral tubular extensions for attaching the wheel cover to the lug nuts of the wheel. Each extension has an outer end which opens onto the cover face and also including a plurality of slots extending axially from an inner end with the slots providing a plurality of fingers which axially forcibly engage with an annular rib of a respective lug nut. The fingers each have an abutment with a tapered wall for engaging the lug nut for flexing the finger radially outward as the wheel cover moves axially towards the wheel and a retaining wall for engaging the lug nut restricting disengaging of the fingers with the abutment. A one-piece wire band retainer has a plurality of circumferentially expanding rings. Each ring encircles the fingers of the tubular extensions of the wheel cover for limiting the outward radially movement of the flexible fingers and biasing the flexible fingers for engagement of the fingers with the lug nuts. The wheel cover is installed by axially forcing the cover toward the wheel as the fingers of the extension flex radially outward as they ratchet past the annular rib of respective lug nuts. The finger and the rings of the retainer restrict removal of the wheel cover from the wheel without removal of the lug nuts.

10 Claims, 3 Drawing Sheets

5,163,739

WHEEL COVER RETENTION

This invention relates to plastic vehicle wheel covers with integral retention and more particularly to such covers with integral tubular slotted extensions encircled by circumferentially expanding retaining rings where the extensions receive the lug nuts to secure the cover to the wheel.

BACKGROUND OF THE INVENTION

It is known to retain vehicle wheels on vehicles by lug nuts, either locking or non-locking, which thread to the lugs of the vehicle. U.S. Pat. No. 4,382,635, Brown et al, Plastic Vehicle Wheel Cover, and U.S. Pat. No. 4,707,035, Kondo et al, Synthetic Resin Vehicle Wheel Cover, show the retention of plastic wheel covers on vehicle wheels by the engagement of the ribbed ends of slotted or unslotted tubular extensions of the cover engaging annular grooves of the lug nuts. It is also known to provide a plastic wheel cover with flanged openings which receive externally threaded lug nuts and to retain the cover to the wheel by flanged plastic caps which thread to the lug nuts and engage the flanges of the cover openings U.S. Pat. No. 4,998,870, Eshler et al, Wheel Trim Retention, assigned to the assignee of this invention, discloses such a retention having the additional feature of retaining the plastic caps to the wheel cover so as to avoid loss.

It would be desirable to have a wheel cover with integral tubular extensions that receive the lug nuts and a retaining ring encircling the tubular extensions for assuring integrity of the engagement of the extension with lug nut and deter unauthorized removal of the wheel cover.

SUMMARY OF THE INVENTION

A wheel cover retention system of this invention has a wheel cover with a cover face for covering a central portion of a wheel and a plurality of integral tubular extensions for attaching the wheel cover to the lug nuts of the wheel. Each extension is slightly tapered from a basal axially outer end which opens onto the cover face to an apical axially inner end and also includes a plurality of slots extending axially from the apical inner end with the slots providing a plurality of fingers adapted for engaging with an annular rib of a respective lug nut. The fingers each have an abutment with a tapered wall for engaging the lug nut for flexing the finger radially outward as the wheel cover moves axially towards the wheel and a retaining wall for engaging the lug nut restricting disengaging of the fingers with the abutment. The wheel cover has a plurality of standoffs which engage the wheel to limit axially movement of the wheel cover toward the wheel. A one-piece wire band retainer has a plurality of circumferentially expanding rings. Each ring encircles the fingers of the tubular extensions of the wheel cover for limiting the outward radially movement of the flexible fingers and biasing the flexible fingers into engagement with the lug nuts. In operation, the wheel cover is installed by axially forcing the cover toward the wheel as the radially flexible fingers of the extension flex radially outward as they ratchet past the annular rib of respective lug nuts. The fingers and the rings of the retainer restrict removal of the wheel cover from the wheel without removal of the lug nuts.

One object, feature and advantage resides in the provision of a wheel cover having a cover face for covering the central portion of the wheel and a plurality of integral tubular extensions formed with the cover body and extending axially from the cover body for attaching the wheel cover to the lug nuts of the wheel, each tubular extension includes a plurality of axial slots subdividing the extension into a plurality of radially flexible cantilevered fingers adapted for engaging with an annular rib of a respective lug nut to retain the wheel cover to the wheel, and a circumferentially expanding retention ring carried by each of the annular extensions for limiting outward radial movement of the flexible fingers and biasing the flexible fingers into engagement with the lug nuts whereby the cover being installed by axially forcing the cover toward the wheel as the radially flexible fingers of the extension flex radially outward as they ratchet past the shoulder of the respective lug nuts.

Another object, feature and advantage resides in the provision of the fingers each having an abutment with a tapered wall for engaging the lug nut for flexing the finger radially outward as the wheel cover moves axially towards the wheel and each abutment having a retaining wall for engaging the annular rib of the lug nut restricting disengaging of the fingers from the lug nut and wheel.

Further objects, features and advantages of the present invention will become more apparent to those skilled in the art as the nature of the invention is better understood from the accompanying drawings and detailed description.

DESCRIPTION OF THE PREFERRED EMBODIMENT

Figure 1:
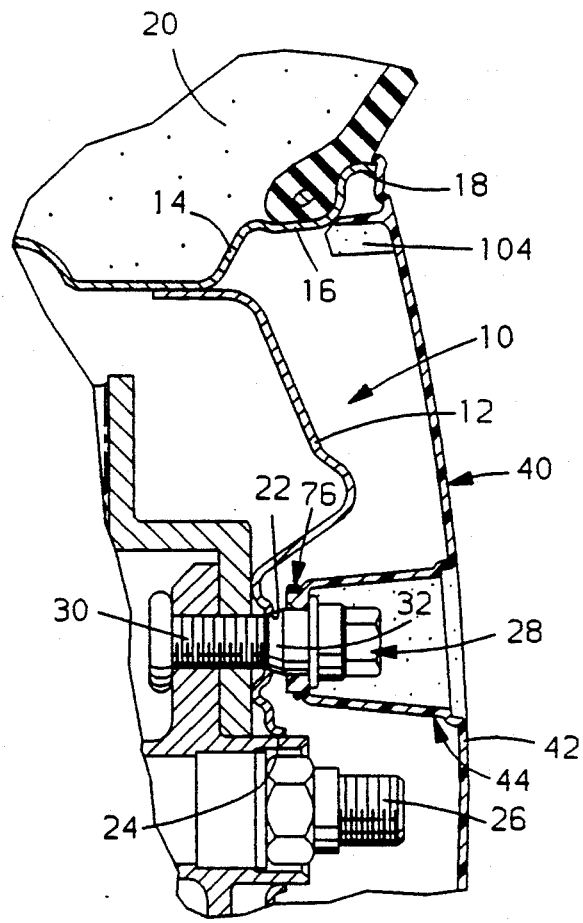
FIG. 1 is a partial sectional view of a vehicle wheel having a wheel cover mounted thereon by a wheel cover retention according to this invention.

Referring now to FIG. 1 of the drawing, a conventional vehicle wheel designated generally 10 includes a center disk portion 12 and an outer rim portion 14 having a tire bead flange 16 and a terminal flange 18. A conventional tire 20 has its side walls seated on flange 16 and a corresponding flange, not shown of the rim portion 14.

The disk portion 12 of the wheel 10 includes a number of openings 22 arranged radially around a center or pilot opening 24 thereof. The pilot opening 24 receives an outwardly offset center portion 26 of the vehicle axle. A lug nut 28 is threaded on each of the lugs 30 of the vehicle axle to mount the wheel 10 thereon. Each lug nut 28 includes a tapered axially inner end 32 which engages a like edge of the respective opening 22 when the lug nut is threaded on the respective lug 30. Any type of conventional vehicle wheel can be used in place of the wheel briefly described above.

Figure 2:
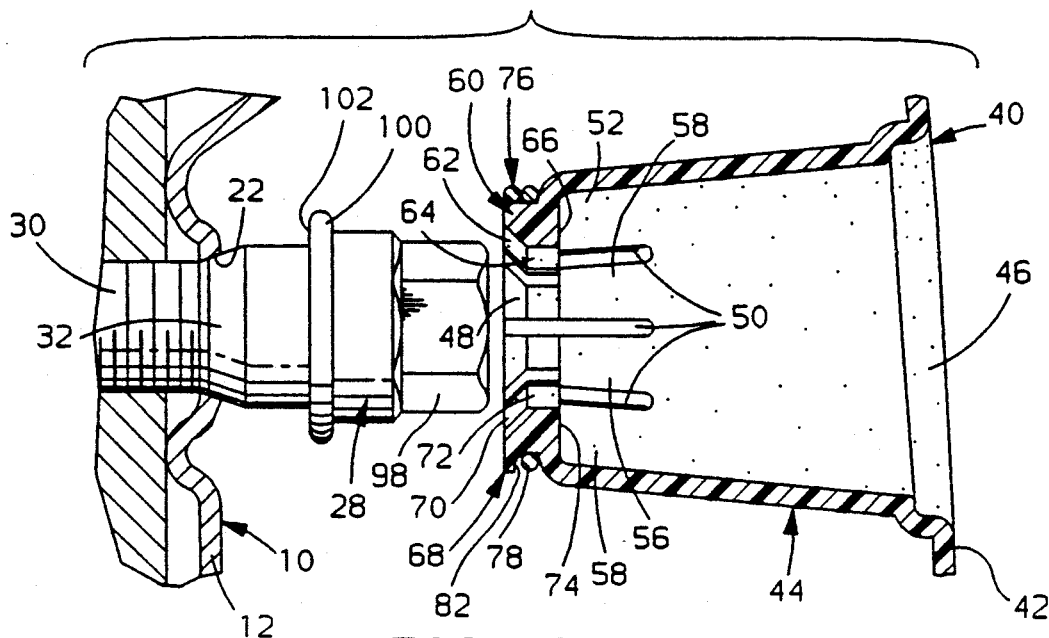
FIG. 2 is an enlarged view of the lug nut and the integral tubular extension of the wheel cover prior to mounting of the wheel cover to the wheel.

A wheel cover 40 of plastic material covers the opening of the disk portion 17. The cover 40 includes a cover face or body portion 42 and a plurality of integral tubular extensions 44, which register with the lug nuts 28. Referring to FIG. 2, the extension 44 is slightly tapered from a basal axially outer end 46 to an apical axially inner end 48. The basal axially outer end opens 46 onto and is integrally connected with the body portion 42 of the wheel cover 40. The extension 44 has a series of slots 50 extending axially from the apical inner end 48 to provide a plurality of radially flexible cantilevered fingers of which the four shown in FIG. 2 are designated 52, 54, 56, and 58. Finger 52 is provided with an integral radially extending abutment 60 which has a tapered wall 62, side wall 64 and a retaining wall 66. The side wall 64 and the retainer wall 66 are generally perpendicular to each other. The other fingers have similar abutments. For example, finger 58 has an abutment 68, including a tapered wall 70, a side wall 72 and a retaining wall 74.

Figure 5:
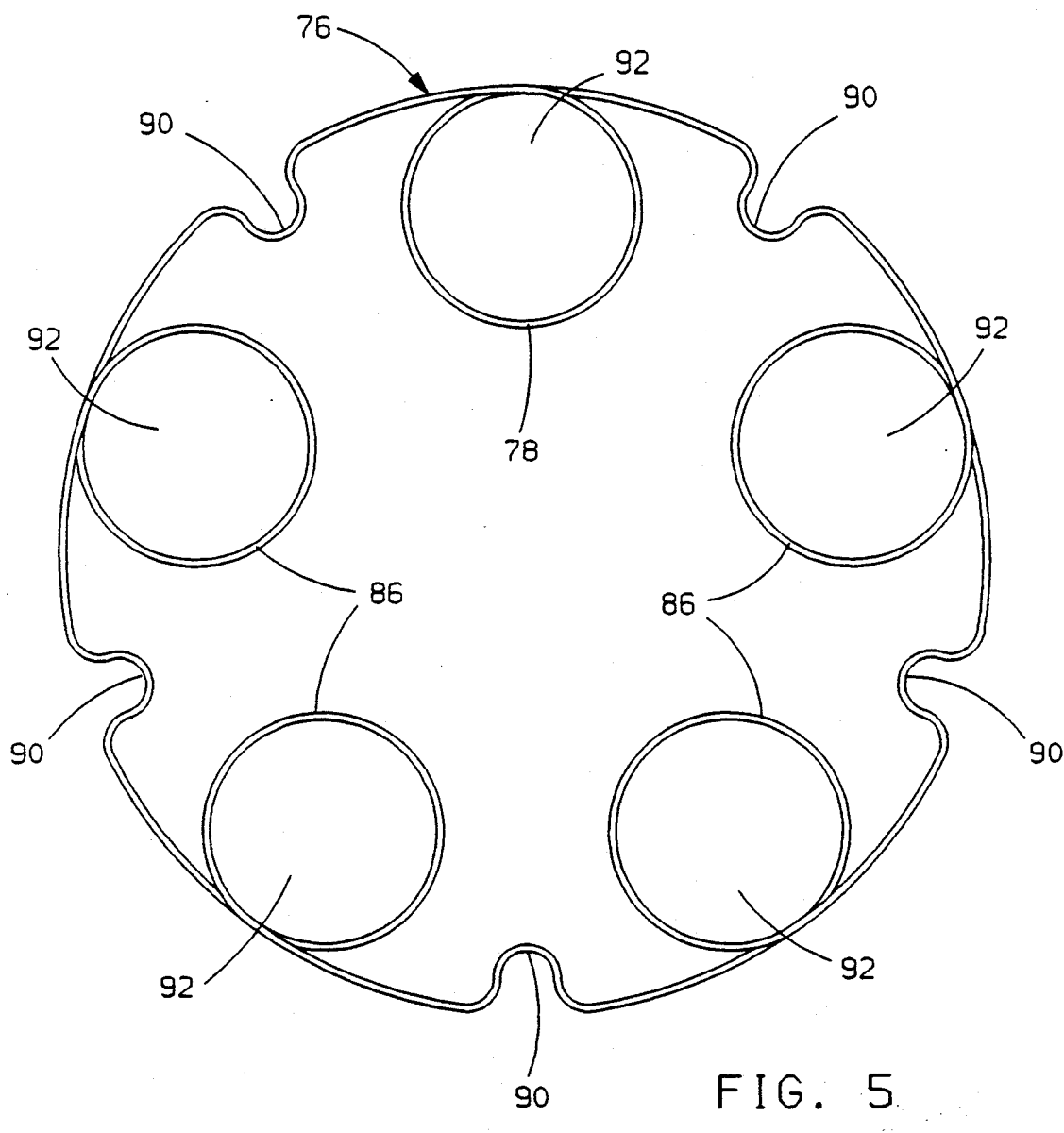
FIG. 5 is a one-piece wire band retainer.

Referring to FIG. 5, a one-piece wire band retainer 76 of stainless steel wire is formed and welded. The retainer 76 is formed with a circumferentially expanding ring 78 to encircle the fingers of the extension 44. Referring to FIG. 2, the abutment 68 of the finger 58 has an undercut 82 to both position and hold the ring 78 of the retainer 76 on the tubular extension 44. Likewise, every other finger has an undercut, for example finger 54. The retainer 76 is formed with additional radial spaced circumferentially expanding rings 86 for each of the other respective extensions and lug nuts. Between the rings 78 and 86 are concave bends 90 which flex and straighten thereby allowing for relative movement between the rings 78 and 86 to conform with variations in locations of the extensions due to manufacturing and allowing for mounting of the wheel cover 40 on the wheel 10 as described below.

The wheel cover 40 including the body portion and the extensions are all integrally molded in a simple type of male-female mold without requiring any multiple action or cam action mold since the flexibility of the fingers permits the undercuts in the abutments to be molded therewith and for the fingers and abutments to flex during removal of the cover from the mold after the molding.

After molding of the wheel cover 40, the retainer 76 is pushed onto the extensions 44 with the fingers flexing radially inward and the circumference of the rings 78 and 86 increasing allowing the rings 78 and 86 to encircle the fingers of the extensions 44 and be received by the undercuts 82. The increase in the circumference of the rings 78 and 86 is facilitated by the concave bends 90 of the retainer 76 flexing to a straightened position.

The wheel cover 40 is mounted to the vehicle wheel 10 by aligning the axially inner ends 48 of the extensions 44 with the lug nuts 28 and then forcibly moving the cover 40 axially towards the wheel 10. Referring to FIG. 2, the abutments describe a circle which is slightly less than the circle of a hexagonal portion 98 of the lug nuts 28 so that the fingers slightly separate or flex radially outwardly as the tapered walls, for example 62 and 70, move over the hexagonal portion 98 of the lug nuts 28.

Figure 3:
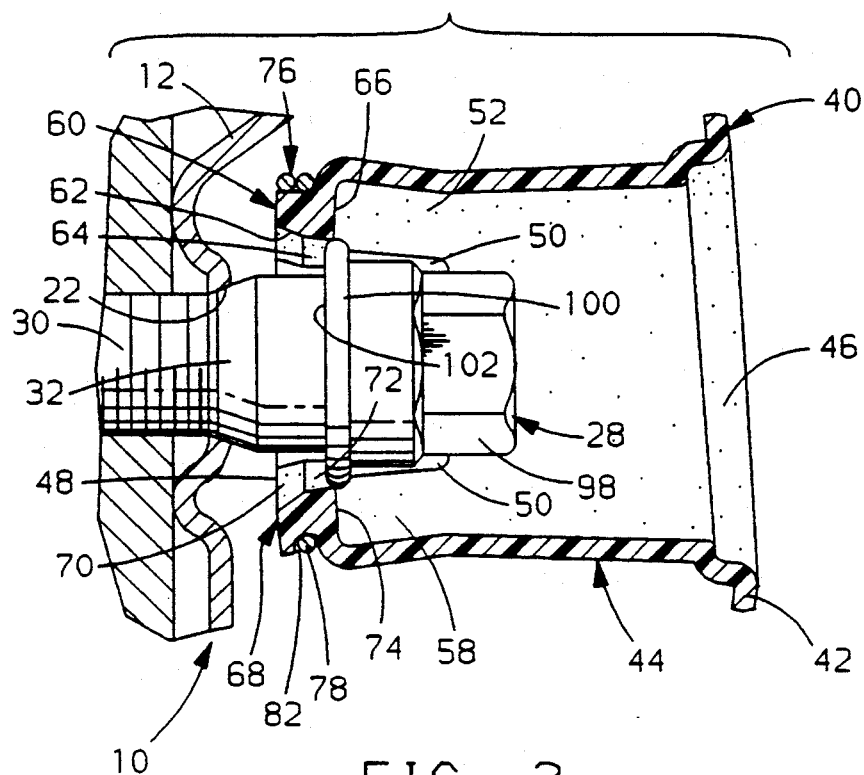
FIG. 3 is a view similar to FIG. 2 showing the installation of the wheel cover on the wheel.
Figure 4:
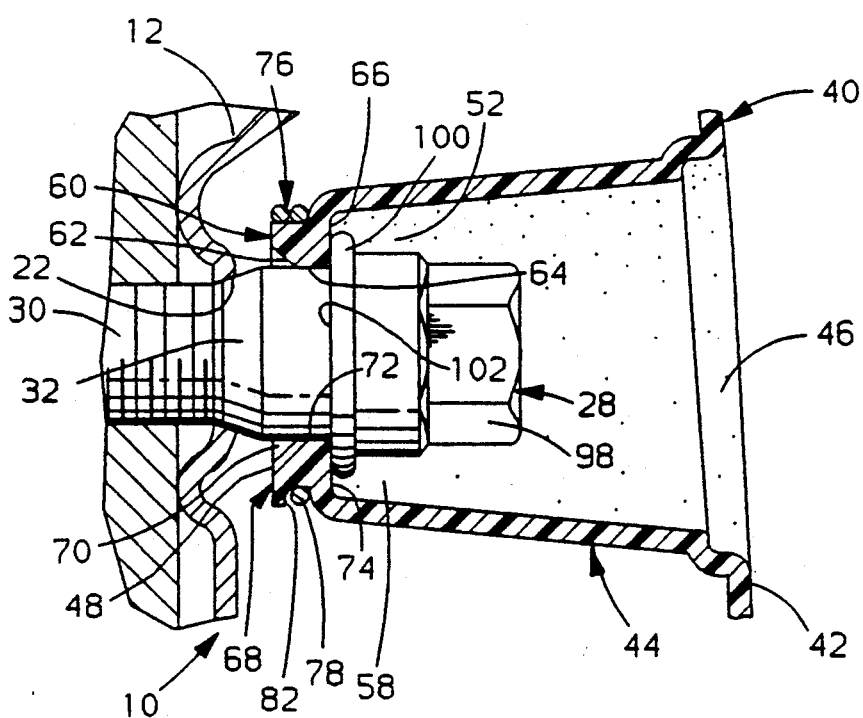
FIG. 4 is an enlarged view of the integral tubular extension of the wheel cover secured to the lug nut.

Referring to FIG. 3, thereafter the fingers, only 52 and 58 seen, further separate as the tapered walls 62 and 70, and the side walls 64 and 72 of the abutments 60 and 68 move or ratchet over an annular rib 100 of the lug nuts 28. Referring to FIG. 4, when the side walls 64 and 72 of the abutments 60 and 68 have ratcheted past the annular rib 100 of the lug nuts 28, the fingers 52 and 58 return substantially to their normal molded shape with the retaining wall 66 and 74 underlying and engaging an underside 102 of the annular rib 100. While the wheel cover 40 is being installed on the wheel 10, the circumference of the rings 78 and 86 increases to allow the fingers to flex axially outwardly in order to move over the lug nuts 28. The rings 78 and 86 of the retainer 76 bias the side walls 64 and 72 of the abutments 60 and 68 into engagement with the lug nuts 28.

The wheel cover 40 can be pushed axially toward the wheel 10 until a plurality of standoffs 104, molded integrally with the wheel cover 40, engages the flange 16 of vehicle wheel 10 just inboard of where wheel balancing weights, not shown, would be placed. The combination of the standoffs 104 engaging the flange 16 and the retaining walls 66 and 74 engaging the annular rib 100 locates the wheel cover 40 axially in relation to the wheel 10.

The wheel cover 40 can be removed from the wheel 10 only by removing the lug nuts 28 from the lugs 30. The retainer 76 and the abutments 60 and 68 with the retaining walls 66 and 74 prevent the abutments 60 and 68 from ratcheting over the annular rib 100 of the lug nuts 28. Thus, the wheel cover 40 is secured to the wheel 10.

Figure 6:
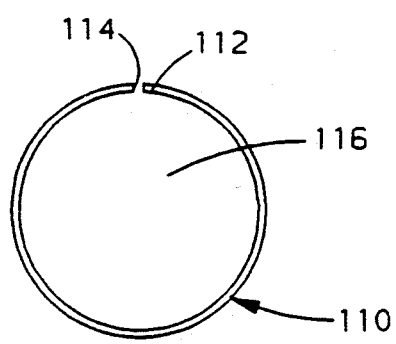
FIG. 6 is a split ring retainer of the second embodiment.

Referring to FIG. 6, a second embodiment has a separate wire split ring circumferentially expanding retainer 110 for each of the integral tubular extension 44. The split ring retainer 110 has a pair of ends 112 and 114 in close proximity to each other. The distance between the ends 112 and 114 increases as the circumference of the ring 110 increases to allow the fingers of the extension 44 to flex radially outward. The retainer 110 works similarly to the retainer 76 of the first embodiment. The increase in circumference of the retainer 110 is accomplished by the distance between the ends increasing as compared to the concave bends straightening.

While two embodiments of the present invention have been explained, various modifications within the spirit and scope of the following claims will be readily apparent to those skilled in the art. For example, the concave bends 90 in the first embodiment could be circumferentially contracting rings that contract as the circumferentially expanding rings 78 and 86 expand. The rings 78 and 86 of the retainer 76 could be connected radially inboard of the rings. The ends 112 and 114 of the split circumferentially expanding retainer 110 could overlap.

The embodiments of the invention in which an exclusive property or privilege is claimed are defined as follows:

1. In a vehicle having a wheel mounted thereon by a number of lug nuts, a wheel cover retention system comprising:

the lug nuts each having a shoulder;

a wheel dover having a cover face for covering the central portion of the wheel and a plurality of intergral tubular extensions formed with the cover body and extending axially from the cover body for attaching the wheel cover to the lug nuts of the wheel, each tubular extension including a plurality of axial slots subdividing the extension into a plurality or axially flexible cantilevered fingers adapted for engaging with the shoulder of a respective lug nut to retain the wheel cover to the wheel and at least one of the cantilevered fingers having a locating means; and circumferentially expanding retention means carried by each of the tubular extension for limiting outward radial movement of the flexible fingers and biasing the flexible fingers into engagement with the lug nuts and the circumferentially expanding retention means received by the locating means of the cantilevered finger for locating the circumferentially expanding retention means on the tubular extension whereby the cover being installed by axially forcing the cover toward the wheel as the radially flexible fingers of the extension flex radially outward as they ratchet past the annular rib of the respective lug nuts.

2. A wheel cover retention system of claim 1 wherein the fingers each having an abutment with a tapered wall for engaging the lug nut for flexing the fingers radially outward as the wheel cover moves axially towards the wheel and each abutment having a retaining wall for engaging the shoulder of the lug nut preventing disengaging of the fingers from the lug nut and the locating means is an undercut located on the abutment of one of the fingers for locating the circumferentially expanding retention means on the abutment.

3. A wheel cover retention system of claim 2 wherein the wheel cover has a stop means for engaging the wheel for limiting the axial movement of the wheel cover towards the wheel.

4. A wheel cover retention system of claim 2 wherein the tubular extensions of the wheel cover each have an opening for access to the lug nut when the wheel cover is mounted to the wheel.

5. In a vehicle having a wheel mounted thereon by a number of lug nuts, a wheel cover retention system comprising:

the lug nuts each having an annular rib;
a wheel cover having a cover face for covering the central portion of the wheel and a plurality of integral tubular extensions for attaching the wheel cover to the lug nuts of the wheel and each extension having a basal axially outer end which opens onto the cover face for access to the lug nuts and a plurality of slots extending axially from the apical inner end with the slots provide a plurality of radially flexible cantilevered fingers adapted for engaging with the annular rib of a respective lug nut to retain the wheel cover to the wheel; and
a one-piece wire band retainer having a plurality of circumferentially expanding rings, each ring encircling the fingers of the tubular extensions of the wheel cover for limiting the outward radially movement of the flexible fingers and biasing the flexible fingers into engagement with the lug nuts whereby the cover being installed by axially forcing the cover toward the wheel as the radially flexible fingers of the extension flex radially outward as they ratchet past the annular rib of the respective lug nuts and the fingers and the rings of the retainer restricting removal of the wheel cover from the wheel without removal of the lug nuts.

6. A wheel cover retention system of claim 5 wherein the fingers each having an abutment with a tapered wall for engaging the lug nut for flexing the fingers radially outward as the wheel cover moves axially towards the wheel and each abutment having a retaining wall for engaging the annular rib of the lug nut restricting disengaging of the fingers from the lug nut.

7. A wheel cover retention system of claim 6 wherein the wire band retainer has a plurality of expansion means where there is at least one expansion means between each of the rings adapted to flex to increase the circumference of the circumferentially expanding rings.

8. A wheel cover retention system of claim 7 wherein the wheel cover having a stop means for engaging the wheel for limiting the axial movement of the wheel cover towards the wheel.

9. A wheel cover retention system of claim 6 wherein the extensions are slightly tapered from the basal axially outer end to the apical inner end and at least one finger of each tubular extension has an undercut to retain the ring.

10. In a vehicle having a wheel mounted thereon by a number of lug nuts, a wheel cover retention system comprising:

the lug nuts each having an annular rib;
a wheel cover having a cover face for covering the central portion of the wheel and a plurality of integral tubular extensions for attaching the wheel cover to the lug nuts of the wheel and each extension extending from a basal axially outer end to an apical axially inner end and each of the basal axially outer ends having an opening for access to the lug nut when the wheel cover is mounted to the wheel, and each extension also including a plurality of slots extending axially from the apical inner end with the slots providing a plurality of radially flexible cantilevered fingers adapted for engaging with the annular rib of a respective lug nut to retain the wheel cover to the wheel and each finger having an abutment with a tapered wall for engaging the lug nut for flexing the finger radially outward as the wheel cover moves axially towards the wheel and each abutment having a retaining wall for engaging the annular rib of the lug nut restricting disengaging of the fingers from the lug nut and at least one of the abutments having an undercut; and
a split ring circumferentially expanding retainer for each of the tubular extensions of the wheel cover encircling the abutments of the fingers for limiting the outward radially movement of the flexible fingers and biasing the flexible fingers into engagement with the lug nuts and the split ring circumferentially expanding retainer received by the undercut of the abutment for locating the split ring circumferentially expanding retainer on the abutment whereby the cover being installed by axially forcing the cover toward the wheel as the radially flexible fingers of the extension flex radially outward as they ratchet past the annular rib of the respective lug nut sand the fingers and the retainer restricting removal of the wheel cover from the wheel without removal of the lug nuts.

* * * * *